US011032159B2

(12) United States Patent
Shin et al.

(10) Patent No.: US 11,032,159 B2
(45) Date of Patent: Jun. 8, 2021

(54) APPARATUS FOR PREFORMANCE ANALYSIS OF VIRTUAL NETWORK FUNCTIONS IN NETWORK FUNCTIONAL VIRTUALIZATION PLATFORM AND METHOD THEREOF

(71) Applicant: Korea Advanced Institute of Science and Technology, Daejeon (KR)

(72) Inventors: Seungwon Shin, Daejeon (KR); Jaehyun Nam, Daejeon (KR); JunSik Seo, Daejeon (KR)

(73) Assignee: Korea Advanced Institute of Science and Technology

( * ) Notice: Subject to any disclaimer, the term of this patent is extended or adjusted under 35 U.S.C. 154(b) by 0 days.

(21) Appl. No.: 16/727,486

(22) Filed: Dec. 26, 2019

(65) Prior Publication Data
US 2020/0396139 A1    Dec. 17, 2020

(30) Foreign Application Priority Data

Jun. 17, 2019 (KR) .................. 10-2019-0071260

(51) Int. Cl.
*H04L 12/24* (2006.01)
*G06F 9/455* (2018.01)
*H04L 12/26* (2006.01)

(52) U.S. Cl.
CPC ...... *H04L 41/5009* (2013.01); *G06F 9/45558* (2013.01); *H04L 41/0893* (2013.01);
(Continued)

(58) Field of Classification Search
CPC ............ H04L 41/5009; H04L 41/0893; H04L 41/0896; H04L 41/12; H04L 41/5054; H04L 43/0817; G06F 9/45558
(Continued)

(56) References Cited

U.S. PATENT DOCUMENTS 9,760,428 B1 * 9/2017 Felstaine ............. G06F 11/2023
9,838,272 B2 * 12/2017 Djukic ................ H04L 41/5058
(Continued)

FOREIGN PATENT DOCUMENTS

JP    2017-050715 A    3/2017
JP    2017050715    *    3/2017    ............. H04L 12/76
(Continued)

*Primary Examiner* — Frantz B Jean
(74) *Attorney, Agent, or Firm* — Christensen O'Connor Johnson Kindness PLLC

(57) ABSTRACT

The inventive concept described herein relates to a performance analysis apparatus of VNF in a NFV platform and a method thereof that may analyze the performance of VNFs in an NFV platform and a factor that causes the performance to be degraded. A performance analysis apparatus of VNF that analyzes performance of the VNF within a NFV platform includes an NFV environment constituting unit generating a service chain composed of VNFs, using a VNF policy configuration of the VNF and configured to deploy the VNFs corresponding to the service chain in the NFV platform, a performance monitoring unit monitoring internal forms of the VNFs by measuring a performance feature of each component within the NFV platform and a performance feature for the service chain, and an analysis unit specifying a performance degradation VNF that degrades performance in the service chain to derive a cause.

14 Claims, 8 Drawing Sheets

(52) U.S. Cl.
CPC .......... *H04L 41/0896* (2013.01); *H04L 41/12* (2013.01); *H04L 41/5054* (2013.01); *H04L 43/0817* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2018/0077080 | A1* | 3/2018 | Gazier | ................ H04L 43/0817 |
| 2018/0205637 | A1* | 7/2018 | Li | ...................... H04L 41/5058 |
| 2019/0199602 | A1* | 6/2019 | Zhang | .................... H04L 41/16 |
| 2019/0363926 | A1* | 11/2019 | Singhal | ............... G06F 9/45558 |
| 2020/0028749 | A1* | 1/2020 | Dhandu | ............. H04L 12/4641 |
| 2020/0366733 | A1* | 11/2020 | Parvataneni | ........ H04L 43/0817 |
| 2020/0379793 | A1* | 12/2020 | Parihar | ............... G06F 9/45558 |

FOREIGN PATENT DOCUMENTS

| | | | | |
|---|---|---|---|---|
| KR | 10-2017-0019192 A | | 2/2017 | |
| KR | 1020170019192 | * | 2/2017 | ............. H04L 12/26 |
| KR | 10-2017-0135359 A | | 12/2017 | |
| KR | 1020170135359 | * | 12/2017 | ............. H04L 12/24 |

\* cited by examiner

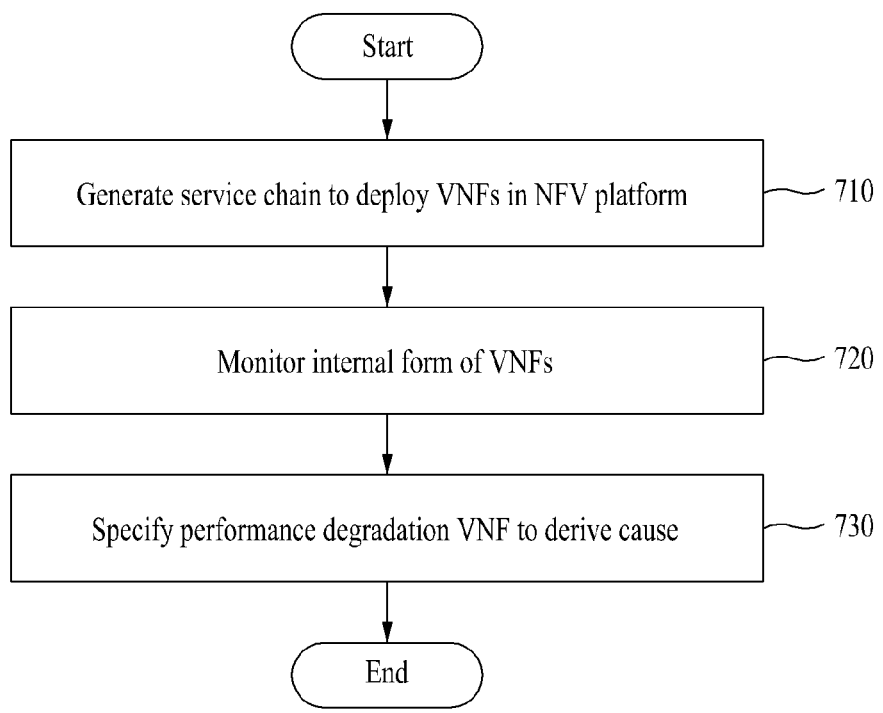

APPARATUS FOR PREFORMANCE ANALYSIS OF VIRTUAL NETWORK FUNCTIONS IN NETWORK FUNCTIONAL VIRTUALIZATION PLATFORM AND METHOD THEREOF

CROSS-REFERENCE TO RELATED APPLICATION

A claim for priority under 35 U.S.C. § 119 is made to Korean Patent Application No. 10-2019-0071260 filed on Jun. 17, 2019, in the Korean Intellectual Property Office, the entire contents of which are hereby incorporated by reference.

BACKGROUND

Embodiments of the inventive concept described herein relate to a performance analysis apparatus of a virtual network function (VNF) in a network function virtualization (NFV) platform and a method thereof, and more particularly, relate to a technology of analyzing the performance of VNFs in an NFV platform and a factor that causes the performance to be degraded.

The NFV platform is the complex of a plurality of components.

Hereinafter, the conventional NFV platform will be described with reference to FIGS. 1 and 2.

FIG. 1 illustrates the structure and the component of the conventional NFV platform. FIG. 2 illustrates an example of the conventional service chain.

As illustrated in FIG. 1, there are factors capable of degrading the overall performance in each component within the conventional NFV platform. However, compared with this diversity, the conventional analysis framework is limited to some performance features such as network throughput, latency, and CPU usage, and is provided in the form of measuring and analyzing the performance of each of the VNFs.

For example, as illustrated in FIG. 2, when there is a service chain, each of VNFs individually measures network throughput, and thus the analysis framework using the conventional NFV platform has found the VNF of low performance; alternatively, the analysis framework using the conventional NFV has found the VNF of low performance using the latency differences between the VNFs. However, because these methods depend on external performance features, there is a limit to specifying whether the VNF causes performance degradation or why performance degradation has occurred.

SUMMARY

Embodiments of the inventive concept specify the VNF that causes performance degradation among all VNFs to the user by analyzing the performance change of each of the VNFs and the effect on surrounding VNFs, when a plurality of VNFs operate as a service chain being the shape of a single chain and may provide the result of analyzing the cause.

According to an exemplary embodiment, a performance analysis apparatus of Virtual Network Function (VNF) that analyzes performance of the VNF within a Network Function Virtualization (NFV) platform includes an NFV environment constituting unit generating a service chain composed of VNFs, using a VNF policy configuration of the VNF and deploying the VNFs corresponding to the service chain in the NFV platform, a performance monitoring unit monitoring internal forms of the VNFs by measuring a performance feature of each component within the NFV platform and a performance feature for the service chain, and an analysis unit specifying a performance degradation VNF that degrades performance in the service chain to derive a cause.

Moreover, the apparatus further includes a collection unit collecting the VNF policy configuration including information associated with the VNF and performance data for performance analysis of the service chain and a workload communication unit transmitting a network workload to the service chain.

The NFV environment constituting unit receives the VNF policy configuration from a user through the collection unit to generate the service chain composed of the plurality of VNFs.

The performance monitoring unit receives the performance data through the collection unit to measure the performance feature of each component within the NFV platform and the performance feature for the service chain, when an NFV environment configuration is completed by the NFV environment constituting unit.

The performance monitoring unit monitors internal operation forms of the VNFs, using a main state transition of a virtual machine.

The performance monitoring unit measures the internal operation forms of the VNFs of at least one or more of a state transition process, the number of respective state transitions, and a change time for each unit time.

The analysis unit includes a classification unit clustering the service chains, each of which is composed of the VNFs, as service chains indicating normal phenomenon or abnormal phenomenon, a derivation unit deriving abnormal VNF within the service chains indicating the abnormal phenomenon and abnormal VNF within VNFs indicating the abnormal phenomenon to derive the abnormal phenomenon based on an internal operation state frequency and time, and a result unit analyzing an abnormal state between derived common abnormal VNF sets, to specify the performance degradation VNF, and to identify triggered cause.

The derivation unit derives abnormal VNFs within the service chains indicating the abnormal phenomenon, derives abnormal VNFs within the VNFs indicating the abnormal phenomenon, and derives the abnormal phenomenon based on the internal operation state frequency and time with respect to a common abnormal VNF set, which commonly causes performance degradation, from among the abnormal VNFs within the service chains and the abnormal VNFs within the VNFs.

The derivation unit lists the internal operation state frequency and time with respect to the common abnormal VNF set to generate a table in which the performance degradation is triggered.

The result unit identifies association of an abnormal state transition between the common abnormal VNF sets based on the table in which the performance degradation is triggered, to analyze the performance degradation VNF, which degrades performance, and a cause of the performance degradation.

The workload communication unit transmits and receives a network workload of a workload for the specific protocol such as TCP or UDP or a workload in which a transmitted network volume is different, to the service chain.

According to an exemplary embodiment, an operating method of an apparatus that analyzes performance of VNF within a NFV platform includes generating a service chain composed of VNFs, using a VNF policy configuration of the VNF and deploying the VNFs corresponding to the service chain in the NFV platform, monitoring internal forms of the VNFs by measuring a performance feature of each component within the NFV platform and a performance feature for the service chain, and specifying a performance degradation VNF that degrades performance in the service chain to derive a cause.

The deploying of the VNFs corresponding to the service chain in the NFV platform includes receiving the VNF policy configuration from a user to generate the service chain composed of the plurality of VNFs.

The monitoring of the internal forms includes measuring the performance feature of each component within the NFV platform and the performance feature for the service chain, using performance data for performance analysis of the service chain when an NFV environment configuration is completed.

The monitoring of the internal forms includes monitoring internal operation forms of the VNFs, using a main state transition of a virtual machine.

The specifying of the performance degradation VNF to derive the cause includes clustering service chains, each of which is composed of the VNFs, as service chains indicating normal phenomenon or abnormal phenomenon, deriving abnormal VNF within service chains indicating the abnormal phenomenon and the abnormal VNF within VNFs indicating the abnormal phenomenon to derive the abnormal phenomenon based on an internal operation state frequency and time, and analyzing an abnormal state between derived common abnormal VNF sets, to specify the performance degradation VNF, and to identify triggered cause.

DESCRIPTION OF THE DRAWINGS

The above and other objects and features will become apparent from the following description with reference to the following figures, wherein like reference numerals refer to like parts throughout the various figures unless otherwise specified, and wherein:

FIG. 7 illustrates an operation flowchart of a performance analyzing method of VNF, according to an embodiment of the inventive concept.

DETAILED DESCRIPTION

Figure 1:
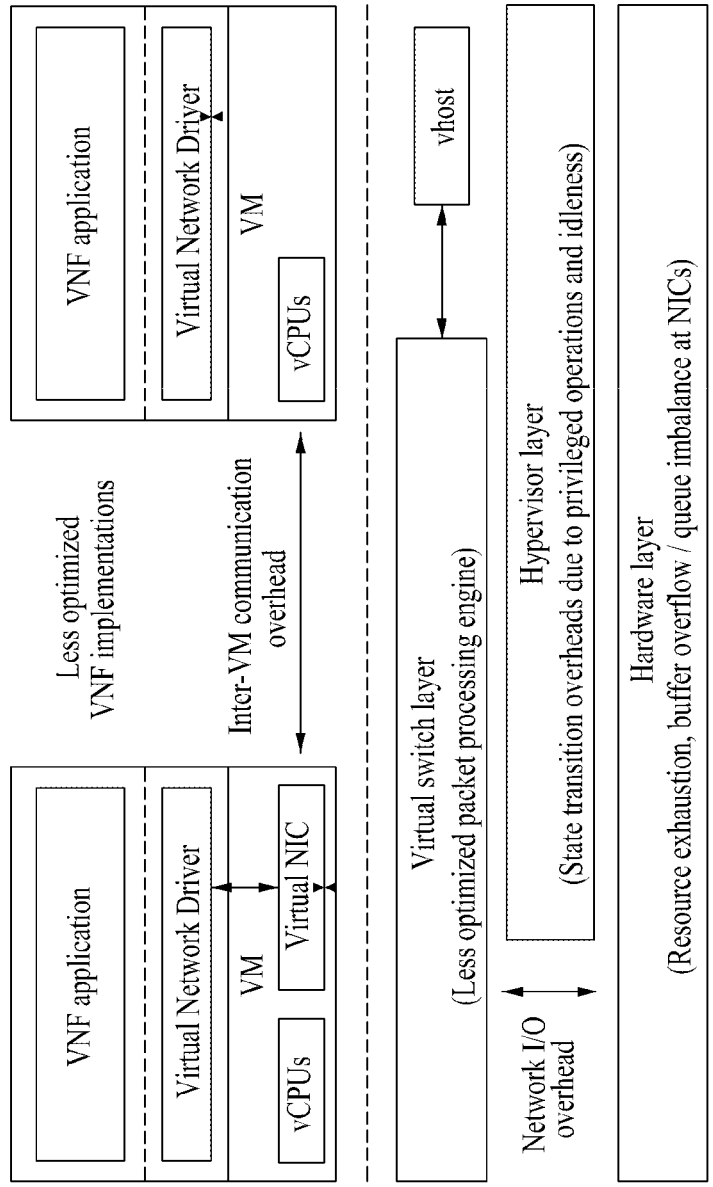
FIG. 1 illustrates the structure and the component of the conventional NFV platform.
Figure 2:
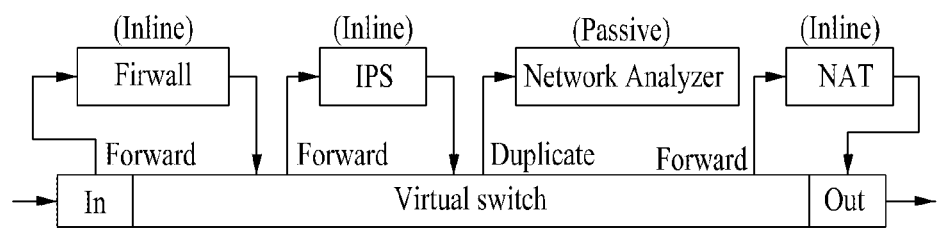
FIG. 2 illustrates an example of the conventional service chain.

Hereinafter, exemplary embodiments of the inventive concept will be described in detail with reference to the accompanying drawings. However, the inventive concept is neither limited nor restricted by the embodiments. Further, the same reference numerals in the drawings denote the same members.

Furthermore, the terminologies used herein are used to properly express the embodiments of the inventive concept, and may be changed according to the intentions of a viewer or the manager or the custom in the field to which the inventive concept pertains. Therefore, definition of the terms should be made according to the overall disclosure set forth herein.

Embodiments of the inventive concept may specify a VNF, of which the performance is degraded, from among chained VNFs, using the service chain in an NFV platform and may analyze the factors causing the performance to be degraded.

According to an embodiment of the inventive concept, it is possible to specify the VNF that causes the performance degradation through roughly two analyzing methods and then to identify the cause of the performance degradation. The first method is to measure the performance feature of each component of the NFV platform and to derive the correlation between each VNFs; the second method is to analyze the internal operation of the VNF and to derive the cause of the actual performance degradation through the changed form of the internal operation.

This inventive concept will be described with reference to FIGS. 3A to 7 as follows.

Figure 3A:
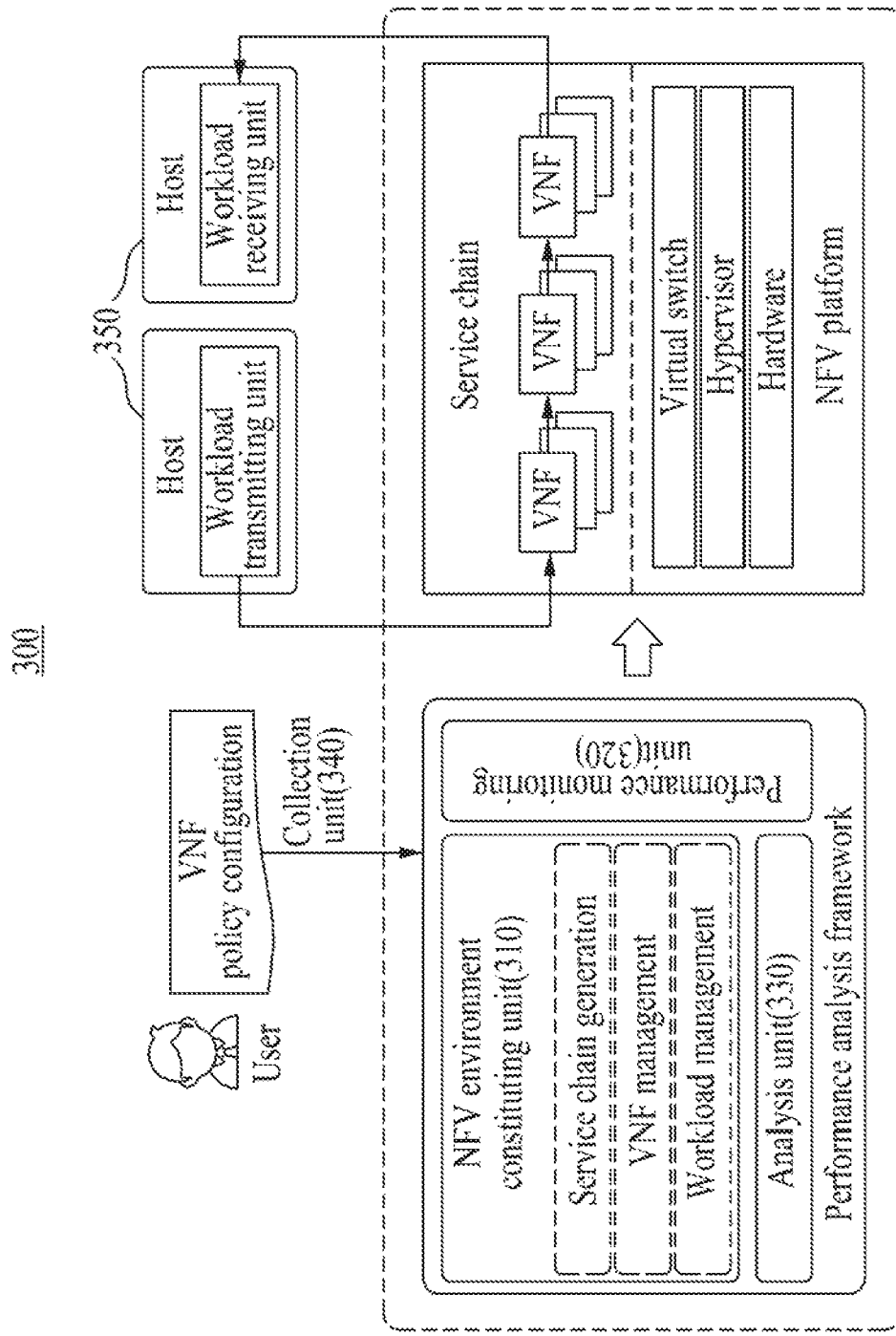
FIGS. 3A and 3B illustrate the detailed structure of a performance analysis apparatus of a VNF, according to an embodiment of the inventive concept.
Figure 3B:
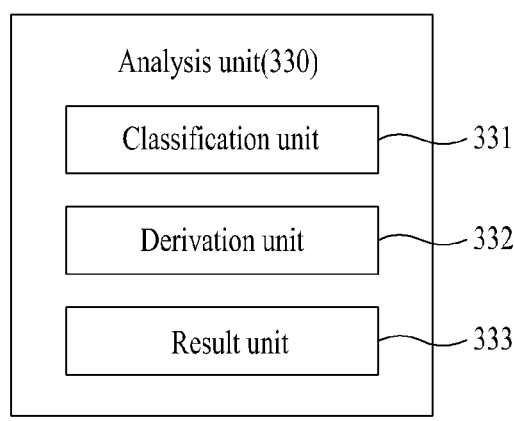

FIGS. 3A and 3B illustrate the detailed structure of a performance analysis apparatus of a VNF, according to an embodiment of the inventive concept.

Referring to FIGS. 3A and 3B, according to an embodiment of the inventive concept, the performance analysis apparatus of VNF analyzes the performance of VNFs in the NFV platform and the factor causing the performance degradation.

To this end, according to an embodiment of the inventive concept, a performance analysis apparatus 300 of a VNF may include an NFV environment constituting unit 310, a performance monitoring unit 320, and an analysis unit 330, and may further include a collection unit 340 and a workload communication unit 350.

The performance analysis apparatus 300 of VNF according to an embodiment of the inventive concept may collect the VNF policy configuration including information associated with the VNF and performance data for analyzing the performance of a service chain, from a user through the collection unit 340. Herein, the VNF policy configuration may be information about VNFs for performing analysis.

The performance analysis apparatus 300 of VNF according to an embodiment of the inventive concept may further include the workload communication unit 350 including a workload transmitting unit and a workload receiving unit; the workload communication unit 350 may transmit and receive the network workload of a workload for the specific protocol such as TCP or UDP or a workload in which the transmitted volume of a network is different, to the service chain.

Referring to FIG. 3A, the performance analysis apparatus 300 of VNF according to an embodiment of the inventive concept suggests a performance analysis framework including the NFV environment constituting unit 310, the performance monitoring unit 320, and the analysis unit 330.

The NFV environment constituting unit 310 generates the service chain composed of VNFs, using the VNF policy configuration of the VNF and deploys the VNFs corresponding to the service chain in the NFV platform. For example, the NFV environment constituting unit 310 may receive the VNF policy configuration received from a user to automatically generate all available chains capable of being composed of the given a plurality of VNFs and may deploy the VNFs corresponding to each service chain to the NFV platform. At this time, the service chain may be that a plurality of VNFs are connected to one another in the form of a chain; the service chain may receive and transmit network workloads of various forms through the workload communication unit 350.

The performance monitoring unit 320 monitors the internal form of VNFs by measuring the performance feature of each component within the NFV platform and the performance feature for the service chain.

When the NFV environment configuration is completed by the NFV environment constituting unit 310, the performance monitoring unit 320 may receive the performance data through the collection unit 340 to measure the performance feature of each component within the NFV platform and the performance feature for the service chain.

Afterward, the performance monitoring unit 320 may monitor the internal operation form of VNFs, using the main state transition of the virtual machine. At this time, the performance monitoring unit 320 may measure the internal operation form of the VNFs of at least one or more of the state transition process, the number of respective state transitions, and the change time for each unit time.

Hereinafter, a performance monitoring unit according to an embodiment of the inventive concept will be described with reference to FIGS. 4 and 5.

Figure 4:
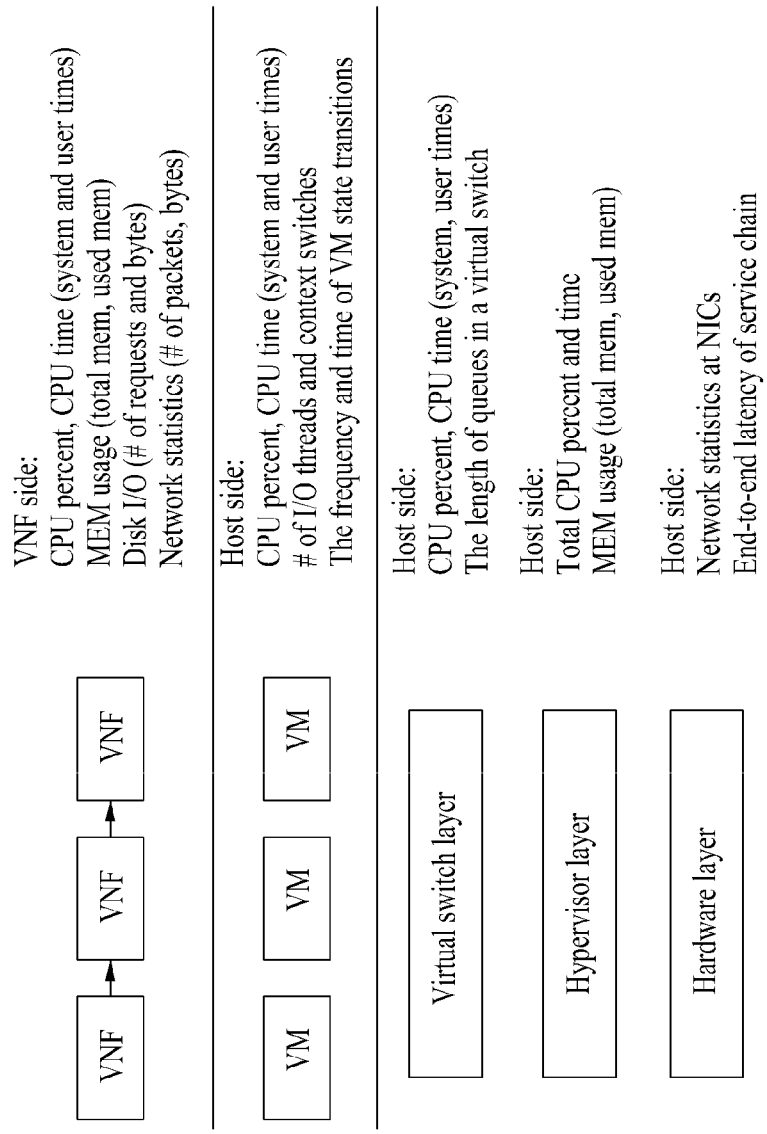
FIG. 4 illustrates a performance feature for each component within an NFV platform, according to an embodiment of the inventive concept.
Figure 5:
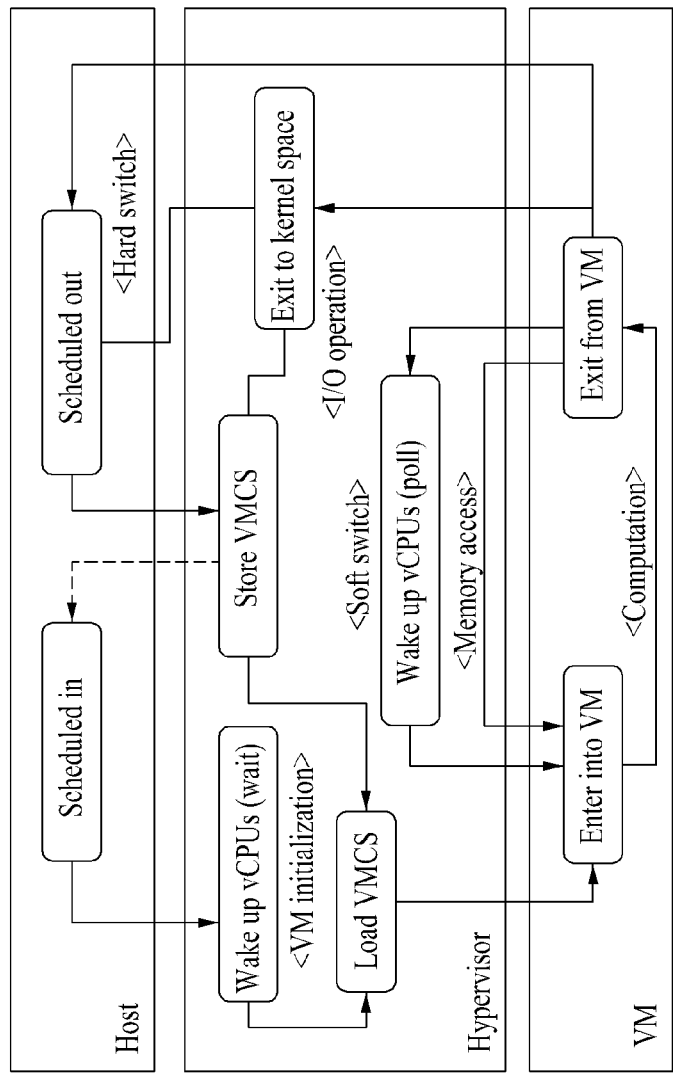
FIG. 5 illustrates the state transition diagram of a virtual machine, according to an embodiment of the inventive concept.

FIG. 4 illustrates a performance feature for each component within an NFV platform, according to an embodiment of the inventive concept. FIG. 5 illustrates the state transition diagram of a virtual machine, according to an embodiment of the inventive concept.

When the NFV environment configuration for each service chain is completed by the NFV environment constituting unit 310, the performance monitoring unit 320 may collect the performance data for performance analysis through the collection unit 340. At this time, the performance monitoring unit 320 may collect pieces of performance data of two forms; as illustrated in FIG. 4, the performance monitoring unit 320 may measure the performance features of each component within the NFV platform and may measure the whole service chain as well as each of the VNFs.

Afterward, for the purpose of analyzing the internal operation form of each of the VNFs, the performance monitoring unit 320 may perform monitoring for tracing the operation form of the virtual machine including each of the VNFs. To this end, as illustrated in FIG. 5, the performance monitoring unit 320 may trace the internal operation form, using the main state transition of the virtual machine. At this time, the performance monitoring unit 320 measures the state transition process, the number of respective state transitions, and the change time for each unit time.

In FIG. 4, the CPU time in the virtual machine (VM) is the same as the sum of the user time of a hypervisor, the system time, and the CPU time in the VNF. Furthermore, referring to the VNF work flow in the hypervisor illustrated in FIG. 5, time the VNF that is spent compared to other VNFs is illustrated in "Scheduled Out"; the time in which the VNF for packet processing is consumed is illustrated in I/O operation process (<I/O operation>). Moreover, the time in which the VNF spends for calculation alone is illustrated in the calculation process (<Computation>); it is determined how often a specific task is triggered in VM termination (Exit from VM).

Returning to FIGS. 3A and 3B, according to an embodiment of the inventive concept, the analysis unit 330 of the performance analysis apparatus 300 of VNF specifies a performance degradation VNF that degrades the performance in the service chain to derive the cause.

In more detail, as illustrated in FIG. 3B, the analysis unit 330 may include a classification unit 331, a derivation unit 332, and a result unit 333.

Hereinafter, the analysis unit 330 according to an embodiment of the inventive concept will be described with reference to FIGS. 3B and 6.

Figure 6:
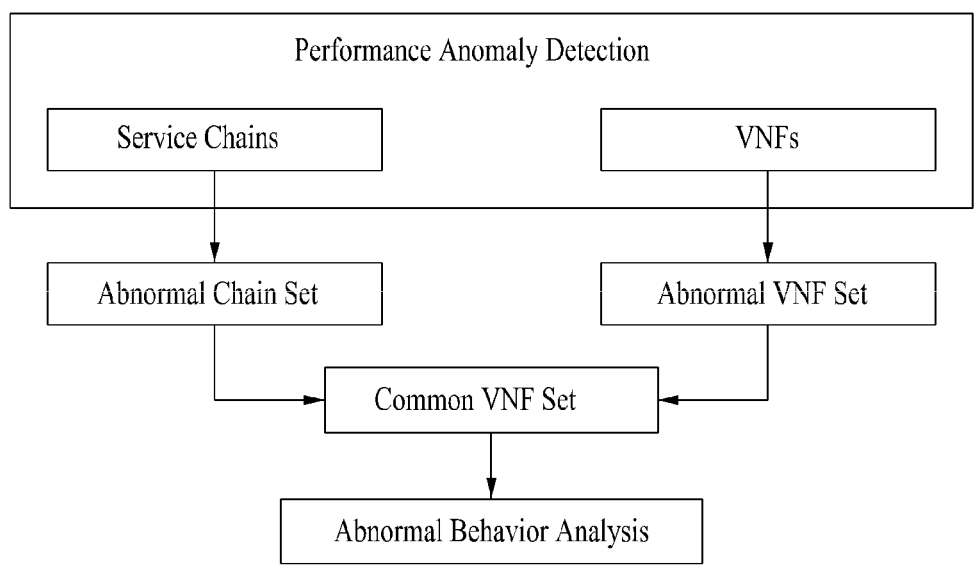
FIG. 6 is a flowchart of a process of analyzing performance through an analysis unit, according to an embodiment of the inventive concept.

FIG. 6 is a flowchart of a process of analyzing performance through an analysis unit, according to an embodiment of the inventive concept.

When performance monitoring for all available service chains is completed by the NFV environment constituting unit 310 and the performance monitoring unit 320, as illustrated in FIGS. 3B and 6, the analysis unit 330 of the performance analysis apparatus 300 of VNF according to an embodiment of the inventive concept may specify the target of performance degradation, that is, the performance degradation VNF, through roughly three-step analysis method and then may derive the cause.

In the first step, the classification unit 331 may cluster service chains composed of VNFs, as service chains indicating normal phenomenon or service chains indicating abnormal phenomenon depending on the performance feature. For example, when VNFs in most of service chains indicate result 'A' with respect to network throughput and then indicate result 'B' within a part of service chains, it may be determined that the service chain indicating result 'B' is a service chain indicative of abnormal phenomenon. As such, the classification unit 331 may cluster the normal phenomenon and the abnormal phenomenon for each performance feature of each of the VNFs.

At this time, the classification unit 331 of the performance analysis apparatus 300 of VNF according to an embodiment of the inventive concept may use outlier detection for detecting the phenomenon.

In the second step, the derivation unit 332 may derive the abnormal VNF within service chains indicating the abnormal phenomenon and the abnormal VNF within VNFs indicating the abnormal phenomenon to derive the abnormal phenomenon based on the internal operation state frequency and time.

In more detail, the derivation unit 332 may derive the abnormal VNFs (Abnormal Chain Set) within the service chains indicating the abnormal phenomenon and the abnormal VNFs (Abnormal VNF set) within VNFs indicating the abnormal phenomenon and may derive a common abnormal VNF set (Common VNF Set) that commonly causes the problem with respect to the abnormal VNFs within the service chains and abnormal VNFs within the VNFs. As such, the derivation unit 332 may derive the abnormal phenomenon (Abnormal Behavior Analysis) based on the internal operation state frequency and time with respect to the common abnormal VNF set.

In the third step, the result unit 333 may analyze the abnormal state between the derived common abnormal VNF sets, may specify the performance degradation VNF, and may identify the triggered cause.

The result unit 333 may identify the association of the abnormal state transition between common abnormal VNF sets based on the table in which the performance degradation is triggered, and may analyze the performance degradation VNF, which degrades the performance, and the triggered cause thereof.

For example, when the derivation unit 332 derives the abnormal phenomenon with respect to the common abnormal VNF set based on the internal operation state frequency and time, the derivation unit 332 may list the state transitions to generate the table in which the performance degradation is triggered. As such, the result unit 333 may analyze whether the corresponding VNFs have caused the abnormal phenomena due to one or more of intensive computation, memory access, interrupt, I/O operation, and context switching, depending on the table in which the performance degradation is triggered.

As a result, the result unit 333 may identify the association according to the abnormal state transition between the finally derived VNFs to specify the performance degradation VNF that degrades the performance and may identify the cause of the degradation.

FIG. 7 illustrates an operation flowchart of a performance analyzing method of VNF, according to an embodiment of the inventive concept.

The method of FIG. 7 is performed by the performance analysis apparatus of VNF according to an embodiment of the inventive concept illustrated in FIG. 3A.

Referring to FIG. 7, in operation 710, the method generates the service chain composed of VNFs, using the VNF policy configuration of the VNF and deploys the VNFs corresponding to the service chain in the NFV platform. For example, in operation 710, the method may receive the VNF policy configuration received from a user to automatically generate all available chains capable of being composed of the given a plurality of VNFs and may deploy the VNFs corresponding to each service chain to the NFV platform.

At this time, the service chain may be that a plurality of VNFs are connected to one another in the form of a chain; the service chain may receive and transmit network workloads of various forms through workload communication unit including a workload receiving unit and a workload transmitting unit.

In operation 720, the method monitors the internal form of VNFs by measuring the performance feature of each component within the NFV platform and the performance feature for the service chain.

When the NFV environment configuration is completed in operation 710, in operation 720, the method may measure the performance feature of each component within the NFV platform and the performance feature for the service chain, using the performance data for performance analysis of the service chain. Afterward, in operation 720, the method may monitor the internal operation form of VNFs, using the main state transition of the virtual machine. At this time, in operation 720, the method may measure the internal operation form of the VNFs of at least one or more of the state transition process, the number of respective state transitions, and the change time for each unit time.

In operation 730, the method specifies a performance degradation VNF that degrades the performance in the service chain to derive the cause.

Operation 730 may include the first step (not illustrated) of clustering service chains composed of VNFs, as service chains indicating normal phenomenon or abnormal phenomenon, the second step (not illustrated) of deriving the abnormal VNF within service chains indicating the abnormal phenomenon and the abnormal VNF within VNFs indicating the abnormal phenomenon to derive the abnormal phenomenon based on the internal operation state frequency and time, and the third step (not illustrated) of analyzing the abnormal state between the derived common abnormal VNF sets and of specifying the performance degradation VNF to identify the triggered cause.

In the first step, the method may cluster service chains composed of VNFs, as service chains indicating normal phenomenon or service chains indicating abnormal phenomenon depending on the performance feature. For example, when VNFs in most of service chains indicate result 'A' with respect to network throughput and then indicate result 'B' within a part of service chains, it may be determined that the service chain indicating result 'B' is a service chain indicative of abnormal phenomenon. As such, in the first step, the method may cluster the normal phenomenon and the abnormal phenomenon for each performance feature of each of the VNFs.

At this time, in the first step, the method may use outlier detection for detecting the phenomenon.

In the second step, the method may derive the abnormal VNF within service chains indicating the abnormal phenomenon and the abnormal VNF within VNFs indicating the abnormal phenomenon to derive the abnormal phenomenon based on the internal operation state frequency and time.

In more detail, the method may derive the abnormal VNFs (Abnormal Chain Set) within the service chains indicating the abnormal phenomenon and the abnormal VNFs (Abnormal VNF set) within VNFs indicating the abnormal phenomenon and may derive a common abnormal VNF set (Common VNF Set) that commonly causes the problem with respect to the abnormal VNFs within the service chains and abnormal VNFs within the VNFs. As such, in the second step, the method may derive the abnormal phenomenon (Abnormal Behavior Analysis) based on the internal operation state frequency and time with respect to the common abnormal VNF set.

In the third step, the method may analyze the abnormal state between the derived common abnormal VNF sets, may specify the performance degradation VNF, and may identify the triggered cause.

In the third step, the method may identify the association of the abnormal state transition between common abnormal VNF sets based on the table in which the performance degradation is triggered, and may analyze the performance degradation VNF, which degrades the performance, and the triggered cause thereof.

For example, when, in the second step, the method derives the abnormal phenomenon with respect to the common abnormal VNF set based on the internal operation state frequency and time, the method may list the state transitions to generate the table in which the performance degradation is triggered. As such, in the third step, the method may analyze whether the corresponding VNFs have caused the abnormal phenomena due to one or more of intensive computation, memory access, interrupt, I/O operation, and context switching, depending on the table in which the performance degradation is triggered.

As a result, in the third step, the method may identify the association according to the abnormal state transition between the finally derived VNFs to specify the performance degradation VNF that degrades the performance and may identify the cause of the degradation.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments of the inventive concept or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer instructions include not only machine language codes created by a compiler, but also high-level language codes that are capable of being executed by a computer by using an interpreter or the like. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to an embodiment of the inventive concept, it is possible to automatically analyze the performance problems occurring in the increasingly complex NFV platform and service chain environments composed of a plurality of VNFs; it is possible to analyze and provide the actual target and the actual cause, which cause performance degradation, rather than the limited and superficial performance analysis in the conventional analysis framework. As such, a user may analyze the effective performance and may solve problems, with low cost and human resources through the inventive concept.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. A performance analysis apparatus of Virtual Network Function (VNF), the apparatus that analyzes performance of the VNF within a Network Function Virtualization (NFV) platform comprising:
   an NFV environment constituting unit configured to generate a service chain composed of VNFs, using a VNF policy configuration of the VNF and configured to deploy the VNFs corresponding to the service chain in the NFV platform;
   a performance monitoring unit configured to monitor internal forms of the VNFs by measuring a performance feature of each component within the NFV platform and a performance feature for the service chain; and
   an analysis unit configured to specify a performance degradation VNF that degrades performance in the service chain to derive a cause, wherein the analysis unit includes:
      a classification unit configured to cluster service chains, each of which is composed of the VNFs, as service chains indicating normal phenomenon or abnormal phenomenon;
      a derivation unit configured to derive abnormal VNF within the service chains indicating the abnormal phenomenon and abnormal VNF within VNFs indicating the abnormal phenomenon to derive the abnormal phenomenon based on an internal operation state frequency and time; and
      a result unit configured to analyze an abnormal state between derived common abnormal VNF sets, to specify the performance degradation VNF, and to identify triggered cause.

2. The apparatus of claim 1, further comprising:
   a collection unit configured to collect the VNF policy configuration including information associated with the VNF and performance data for performance analysis of the service chain; and
   a workload communication unit configured to transmit a network workload to the service chain.

3. The apparatus of claim 2, wherein the NFV environment constituting unit receives the VNF policy configuration from a user through the collection unit to generate the service chain composed of the plurality of VNFs.

4. The apparatus of claim 3, wherein the performance monitoring unit receives the performance data through the collection unit to measure the performance feature of each component within the NFV platform and the performance feature for the service chain, when an NFV environment configuration is completed by the NFV environment constituting unit.

5. The apparatus of claim 4, wherein the performance monitoring unit monitors internal operation forms of the VNFs, using a main state transition of a virtual machine.

6. The apparatus of claim 5, wherein the performance monitoring unit measures the internal operation forms of the VNFs of at least one or more of a state transition process, the number of respective state transitions, and a change time for each unit time.

7. The apparatus of claim 1, wherein the derivation unit derives abnormal VNFs within the service chains indicating the abnormal phenomenon, derives abnormal VNFs within the VNFs indicating the abnormal phenomenon, and derives the abnormal phenomenon based on the internal operation state frequency and time with respect to a common abnormal VNF set, which commonly causes performance degradation, from among the abnormal VNFs within the service chains and the abnormal VNFs within the VNFs.

8. The apparatus of claim 7, wherein the derivation unit lists the internal operation state frequency and time with respect to the common abnormal VNF set to generate a table in which the performance degradation is triggered.

9. The apparatus of claim 8, wherein the result unit identifies association of an abnormal state transition between the common abnormal VNF sets based on the table in which the performance degradation is triggered, to analyze the performance degradation VNF, which degrades performance, and a cause of the performance degradation.

10. The apparatus of claim 2, wherein the workload communication unit transmits and receives a network workload of a workload for the specific protocol such as TCP or UDP or a workload in which a transmitted network volume is different, to the service chain.

11. An operating method of an apparatus that analyzes performance of VNF within a NFV platform, the method comprising:

generating a service chain composed of VNFs, using a VNF policy configuration of the VNF and deploying the VNFs corresponding to the service chain in the NFV platform;

monitoring internal forms of the VNFs by measuring a performance feature of each component within the NFV platform and a performance feature for the service chain; and specifying a performance degradation VNF that degrades performance in the service chain to derive a cause, wherein the specifying of the performance degradation VNF to derive the cause includes:
  clustering service chains, each of which is composed of the VNFs, as service chains indicating normal phenomenon or abnormal phenomenon;
  deriving abnormal VNF within service chains indicating the abnormal phenomenon and the abnormal VNF within VNFs indicating the abnormal phenomenon to derive the abnormal phenomenon based on an internal operation state frequency and time; and
  analyzing an abnormal state between derived common abnormal VNF sets, to specify the performance degradation VNF, and to identify triggered cause.

12. The method of claim 11, wherein the deploying of the VNFs corresponding to the service chain in the NFV platform includes:
receiving the VNF policy configuration from a user to generate the service chain composed of the plurality of VNFs.

13. The method of claim 11, wherein the monitoring of the internal forms includes:
when an NFV environment configuration is completed, measuring the performance feature of each component within the NFV platform and the performance feature for the service chain, using performance data for performance analysis of the service chain.

14. The method of claim 13, wherein the monitoring of the internal forms includes:
monitoring internal operation forms of the VNFs, using a main state transition of a virtual machine.

* * * * *